(12) United States Patent
Martin et al.

(10) Patent No.: US 7,230,396 B1
(45) Date of Patent: Jun. 12, 2007

(54) DEVICE METHOD FOR SWITCHING OF CURRENTS IN A STATOR WINDING OF A GENERATOR-ELECTRIC MOTOR COMBINATION

(75) Inventors: Sven Martin, Wolfsburg (DE); Bernd-Guido Schulze, Wolfsburg (DE); Oliver Rauch, Gifhorn (DE); Markus Billman, Euskirchen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 230 days.

(21) Appl. No.: 11/058,481

(22) Filed: Feb. 15, 2005

Related U.S. Application Data

(63) Continuation of application No. PCT/EP03/08585, filed on Aug. 2, 2003.

(30) Foreign Application Priority Data

Aug. 16, 2002  (DE) ................................. 102 37 451

(51) Int. Cl.
  *H02P 7/34* (2006.01)
  *H02M 3/158* (2006.01)
(52) U.S. Cl. ....................................... 318/140; 318/144
(58) Field of Classification Search ........ 318/140–145, 318/254, 701; 290/7
  See application file for complete search history.

(56) References Cited

U.S. PATENT DOCUMENTS 5,111,378 A    5/1992   Nowak et al. ................. 363/98
5,523,632 A    6/1996   Seragnoli .................... 307/125
5,659,452 A *  8/1997   Blackburn ..................... 361/31
5,675,203 A    10/1997  Schulze et al. .............. 310/113
5,689,164 A *  11/1997  Hoft et al. ................... 318/701
5,945,801 A *  8/1999   Yamada et al. .............. 318/701
6,384,564 B1*  5/2002   Pollock ........................ 318/701
7,123,821 B1* 10/2006   Hayden ....................... 388/830

FOREIGN PATENT DOCUMENTS

DE      44 08 719    7/1995
DE      692 07 190   6/1996
DE      198 53 516   5/2000

* cited by examiner

*Primary Examiner*—Bentsu Ro
(74) *Attorney, Agent, or Firm*—Baker Botts L.L.P.

(57) ABSTRACT

The invention relates to a device and a method for switching currents in a stator winding (1) of a generator/electric motor combination, said stator winding (1) comprising at least one winding which can be short-circuited or switched in a highly-resistive manner by means of at least one device (T1, D1; T2, D2). Said at least one winding is connected to a capacitor (C), by which means the voltage peaks thereof can be reduced as a result of switching processes, and energy stored in the stator winding can be temporarily stored. At least one switchable decoupling element (2) is arranged between the winding and the capacitor (C). The energy to be temporarily stored can be branched off as a charging current to the capacitor by means of the decoupling element (2), as a result of the disconnection of the device in a non-working cycle, and the temporarily stored energy can be fed back into the stator winding (1) as a working current in the working cycle. The decoupling element (2) is temporally controlled during the feedback in such a way that the capacitor voltage UC does not fall below a set voltage value.

19 Claims, 3 Drawing Sheets

DEVICE METHOD FOR SWITCHING OF CURRENTS IN A STATOR WINDING OF A GENERATOR-ELECTRIC MOTOR COMBINATION

CROSS REFERENCE TO RELATED APPLICATION

This application is a continuation of copending International Application No. PCT/EP2003/008585 filed Aug. 2, 2003, which designates the United States, and claims priority to German application number 10237451.1 filed Aug. 16, 2002.

TECHNICAL FIELD

The invention concerns a device and method for switching currents in a stator winding of a generator-electric motor combination.

BACKGROUND

Such a generator-electric motor combination is known from DE 44 08 719 C1. It is proposed here that the generator-electric motor combination have a housing, in which a rotor and a stator, both of the generator and of the electric motor are arranged, having a hollow cylindrical generator-rotor fastened to an input shaft and a hollow cylindrical motor-rotor fastened to an output shaft, the rotors lying axially next to each other, and having permanent magnets of alternating polarity distributed on their interior in the peripheral direction, and having a hollow cylindrical stator arranged within the hollow cylindrical rotors with at least one winding, in which the two rotors are switched relative to each other, depending on the position of the permanent magnets. The stator winding, depending on the desired force direction of the electric motor, is shorted or switched to high resistance by mutual switching of power semiconductors of a half-bridge of the known device, functioning as switching elements, according to the pole position of the electric motor.

A shortcoming in the known device is that during switching off of the current in the stator winding, the energy stored in the inductance is necessarily lost. In addition, another drawback is that the switching elements are threatened by the extremely high voltage peaks that occur during switching off.

To solve this problem, it is known from DE 198 53 516 A1 to divide the winding into two winding parts with an inductance by at least one tap, in which a capacitor is connected into the tap, which separates the two winding parts of the winding electrically at least partially when exposed to a high frequency disengagement current. Because of this, the energy in the inductance is temporarily stored in the capacitor and in the operating cycle, when the winding is shorted again, it is fed back into the winding. In addition to temporary power storage, the capacitor limits the peak voltage occurring on the semiconductor switching element according to the formula $I^2 * L/2 = U^2 * C/2$, since the voltage on the capacitor cannot jump. A switch, additionally incorporated in the capacitor branch, prevents undesired charging of the capacitor in the nonworking cycle (winding is switched to high resistance), as well as oscillation of the current as a result of the oscillation properties of the LC circuit.

A shortcoming in this circuit is that the time constant of the energy accumulator for charging and discharge at a given inductance is dependent on the size of the capacitor. On the one hand, there is then a need for a large capacitance, in order to reduce the peak voltage, and, on the other hand, the capacitance should be low, in order to switch steep pulses through a limited time constant.

SUMMARY

The technical problem underlying the invention is therefore to devise an apparatus for switching currents in a stator winding of a generator-electric motor combination, and to provide a corresponding method, by means of which steeper rising and falling flanks can be switched by temporary storage of the electrical power from the inductance.

The solution to the technical problem is obtained by a device for switching currents in a stator winding of a generator-electric motor combination, in which the stator winding has at least one winding that can be shorted or switched to high resistance through at least one device, in which the at least one winding is connected to a capacitor, by means of which voltage peaks, because of the switching processes, can be reduced and the energy stored in the stator winding can be temporarily stored, wherein at least one switchable decoupling element is arranged between the winding and the capacitor, in which the energy to be temporarily stored via decoupling element can be taken off, because of disengagement of the device in a nonworking cycle, as charging current for the capacitor and the temporarily stored energy fed back to the stator winding as working current in the working cycle, in which case the decoupling element is temporarily controlled during feedback, so that the capacitor voltage Uc does not drop below a fixed voltage value.

The decoupling element can be designed as a switch with parallel-connected recovery diodes. The fixed voltage value for the capacitor voltage Uc can be greater than or equal to the voltage on the decoupling element in the nonworking cycle. At least one switching element with parallel-connected recovery diode can be arranged on each end of the winding. The decoupling element can be connected as a center tap on the winding. The winding can be arranged in a bridge circuit, in which two decoupling elements are arranged in one branch and the two switching elements with parallel-connected recovery diodes are arranged in the other branch. The switching elements can be designed as transistors. The transistors can be designed as IGBTs. The stator winding may include several independent windings as partial motors that are designed with a common capacitor.

The solution to the technical problem can also be obtained by a method for switching currents in a stator winding of a generator-electric motor combination, in which the stator winding has at least one winding that can be shorted or switched to high resistance through at least one device, wherein the at least one winding is connected to a capacitor via a switchable decoupling element, in which energy stored in the stator winding during high-resistance switching of the winding through a charging current is temporarily stored in the capacitor via the decoupling element, and the stored energy is fed back into the stator winding via the connected decoupling element in the working cycle, in which the capacitor is always discharged only to a capacitor voltage greater than or equal to a fixed voltage value. For this purpose, at least one switchable decoupling element is arranged between the winding and the capacitance, in which case the decoupling element is conducting when the device or winding is switched off in a nonworking cycle, so that the voltage peaks through the capacitor are limited and the energy stored in the inductance is temporarily stored in the capacitor as charging current, and the temporarily stored energy can be fed back to the stator winding as operating current in the operating cycle, in which case the decoupling element is controlled temporarily during feedback, so that the capacitor voltage does not drop below a fixed voltage value. The idea underlying this invention is not to completely discharge and recharge the capacitor during each operating cycle, but to keep its voltage as constant and high as possible during operation of the machine, depending on the load point. This occurs owing to the fact that the decoupling element is only made conducting according to a specified function. For example, this can be a specific time period. For this purpose, the minimal charge voltage of the capacitor is determined and it is calculated by means of the time constant RC how long the discharge may last, so that the capacitor voltage does not drop below the stipulated voltage value. Another possibility is to measure the capacitor voltage and generate from this measurement signal a control signal for the decoupling element. The level of the overvoltage on the devices for short-circuiting or switching the winding to high resistance is determined as in DE 198 53 516 A1, according to the formula $I^2*L/2=U^2*C/2$ and can be kept small by a large value of C. This large C, however, has virtually no adverse effect on the time constant of the current after disengagement or engagement of the stator winding, since the capacitor is not fully discharged.

In a preferred variant, the decoupling element is designed as a switch with parallel-connected recovery diode. The switch is then temporarily closed only for discharge of the capacitor. On the other hand, during voltage peaks from switching off of the stator winding, a charge current can flow to the capacitor via the recovery diode, so that the decoupling element is almost self-controlling during charging.

The fixed voltage value for the capacitor is preferably greater than or equal to the voltage on the decoupling element in the nonworking cycle, in order to avoid charging in this operating state. Because of the pole position of the two rotors in the nonworking cycle, the voltages induced there are added and represent the largest possible voltage value on the decoupling element outside of the switching phases, so that undesired charging of the capacitor is therefore avoided in each operating state (working cycle or nonworking cycle).

In order to permit an arbitrary direction of rotation of the two rotors, at least one switching element with a parallel-connected recovery diode is preferably allocated to each end of the winding, so that the current direction in the winding can be switched according to the desired direction of rotation.

In another preferred variant, the switching elements are designed as transistors, in which case these are preferably designed as IGBTs.

In another preferred variant, the stator winding comprises several independent stator windings that are designed with a common capacitor. Because of this, the pulsating moment can be evened out, in which case, because of operation on a common capacitor, it can be dimensioned smaller or the voltage surge on the capacitor can be reduced, since the windings, acting as partial motors, are not situated in the same operating or switching state, so that the energy can be partially switched directly via the decoupling elements from one partial motor to another partial motor without charging or discharging the capacitor.

BRIEF DESCRIPTION OF THE DRAWINGS

The invention is further explained below by means of a preferred practical example. In the figures.

DETAILED DESCRIPTION

The circuit arrangement includes a stator winding 1 with an inductance L, on whose end a switching element T1 or T2 with a parallel-connected recovery diode D1 or D2 is arranged. The stator winding 1 is connected to a capacitor C via a decoupling element 2 connected as a center tap. The decoupling element 2 comprises a switching element T3 with parallel-connected recovery diode D3.

For operation of the generator-electric motor combination, the stator winding 1 is ideally short-circuited or switched to high resistance in pulse-like fashion, in which case the direction of rotation of the combination can be varied via the current direction in stator winding 1. DE 44 08 719 C1 and DE 198 53 516 A1 are referred to for detailed description of the basic principle of such a generator-electric motor combination.

Figure 1:
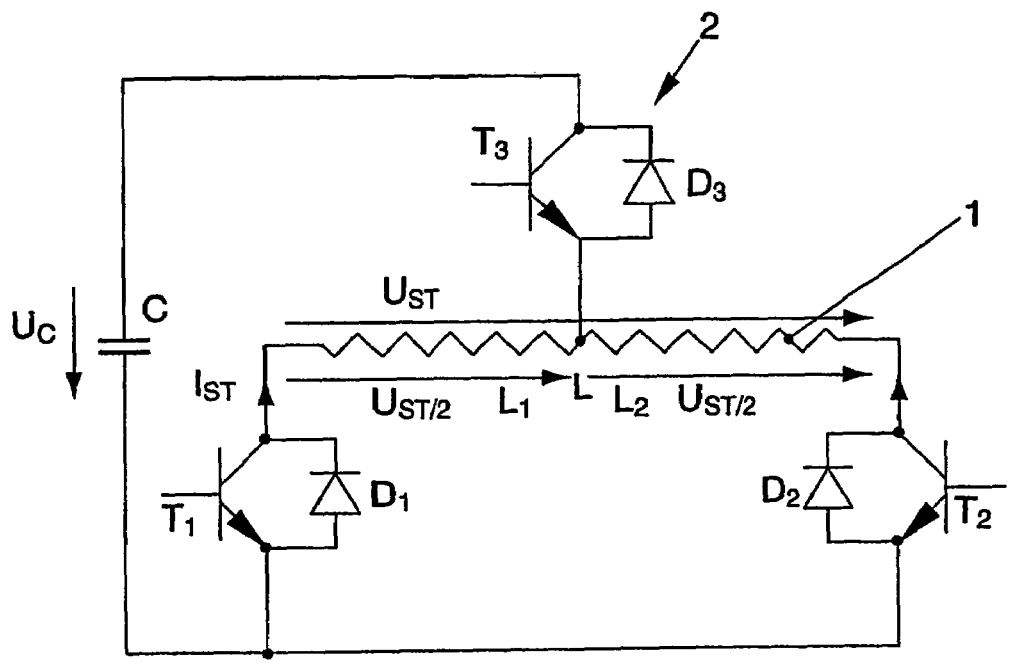
FIG. 1 shows a circuit arrangement with a center tap of a stator winding.

If, for example, the current in stator winding 1 is supposed to flow as indicated in FIG. 1, the switching element T1 is permanently blocked in this method of operation, whereas the switching element T2 is switched on and off in pulse-like fashion, during which the current change is only trapezoidal, because of inductance L.

During blocking of T2, the two diodes D1 and D2 are switched relative to each other and prevent further current flow. This large $dI_{ST}/dt$ causes a large $U_{ST}$ over the stator winding 1. If $U_{ST/2}$ is then greater than the voltage Uc on capacitor C, the recovery diode D3 of the decoupling element 2 conducts. Capacitor C again limits the rate of change of the voltage on the coil, since the voltage on capacitor C cannot be changed abruptly for energy reasons. The voltage peaks, because of the current change on inductance L, are therefore dampened and the energy stored in inductance L flows in the form of a charging current through recovery diode D3 into capacitor C and charges it. The inductance is divided, because of the center tap. Since the two partial coils L1, L2 have only half the windings of the stator winding, the inductance of a partial coil L1, L2 is only L/4 of the stator winding, so that the voltage change is also limited according to the relation $U_{ST/2}=L2\, di/dt$. The reason for this is the quadratic relation between inductance L and number of windings N. The energy stored in the other inductance L1 is then converted as voltage into inductance L2, and also temporarily stored as charging current in capacitor C. If the voltage $U_{ST/2}$ on L2 drops below the capacitor voltage Uc, diode D3 blocks and therefore decouples, together with this blocked switching element T3, the capacitor C from the stator winding 1. This energy, temporarily stored in the nonworking cycle ($I_{ST}=0$), is supposed to be fed back in the working cycle, when the switching element T2 is closed again. For this purpose, the switching element T3 is now closed, so that capacitor C is discharged, during which the discharge current is fed with the same sign. According to the invention, the capacitor C is not fully discharged, but only to a voltage $Uc > U_{ST/2}$ in the nonworking cycle. The basic idea is that the capacitor voltage Uc in the operating case of the machine (working cycle or nonworking cycle) is always greater than or equal to the voltage on the decoupling element. It is ensured by the recovery diode D3 that, in the operating case, no energy flow occurs to capacitor C, which would increase the blind power of the machine. In the nonworking cycle, the phase voltage induced by the permanent magnets of both rotors is greatest, since they are added with the same sign, so that Uc is therefore preferably adjusted to the phase voltage in the nonworking cycle. in principle, the switching behavior, however, is already improved, if the capacitor voltage Uc is not discharged below any fixed voltage value, but the blind power then increases.

The advantages of this circuit arrangement include temporary storage of the inductive energy with a limitation of the voltage peaks, in which, however, very steep trapezoidal flanks can be attained, since the capacitor C is only charged or discharged with a limited voltage surge.

Control of the switching element T3 can then be designed differently. It is possible to measure the capacitor voltage Uc and to open the switching element T3 accordingly on reaching a fixed voltage value. On the other hand, a time can also be established by means of the RC time constant, for which the switching element is closed, in which case the time is determined, so that the capacitor voltage Uc is sufficiently high in each operating case. This entails the additional advantage that the circuit arrangement operates in self-controlling fashion. For example, if, during switching off of the stator winding, more energy is temporarily stored in capacitor C than can be fed back to the working cycle in the next switching process, the capacitor voltage Uc rises. A rise of Uc, however, automatically leads to a larger Ic during the next feed, i.e., the capacitor C supplies more energy back when Uc increases. Self-destruction of capacitor C is therefore counteracted.

Figure 2:
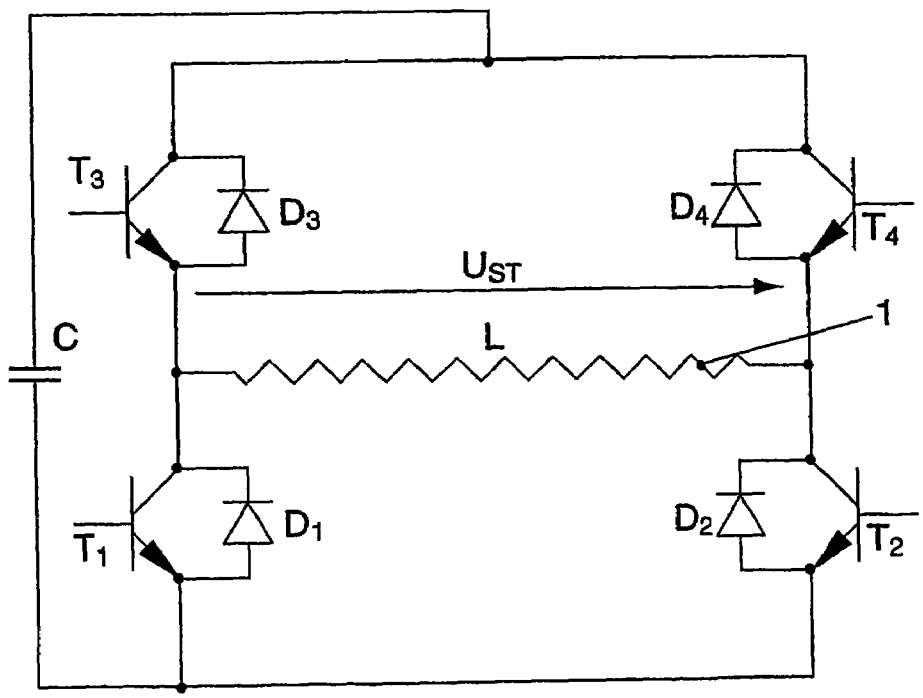
FIG. 2 shows a circuit arrangement with a bridge circuit for a stating winding.

An alternative circuit arrangement is shown in FIG. 2, in which the stator winding 1 is arranged in a bridge circuit. Instead of a decoupling element 2, two decoupling elements are arranged here on the ends of the stator winding 1. In principle, the same things apply as were already stated relative to the circuit according to FIG. 1, but, in this case, Uc is to be chosen greater than or equal to the full phase voltage $U_{ST}$. The operating method of the circuit is that the switching element T1 or T2 is permanently opened according to the desired direction of rotation in the working cycle, whereas the other switching element T2 or T1 is switched in pulse-like fashion. In the nonworking cycle, on the other hand, all switching elements are open. During the disengagement process, the capacitor C is charged via the diagonal recovery diodes D3 and D4. If, for example, the switching element T2 is cycled, the current flows through recovery diode D3 when T2 is switched off. To discharge capacitor C, the switching element T3 is then briefly closed. The advantage of the bridge circuit relative to a center tap is that the coupling losses between the two halves of the coil are avoided, as occur in the center tap according to FIG. 1.

Figure 3:
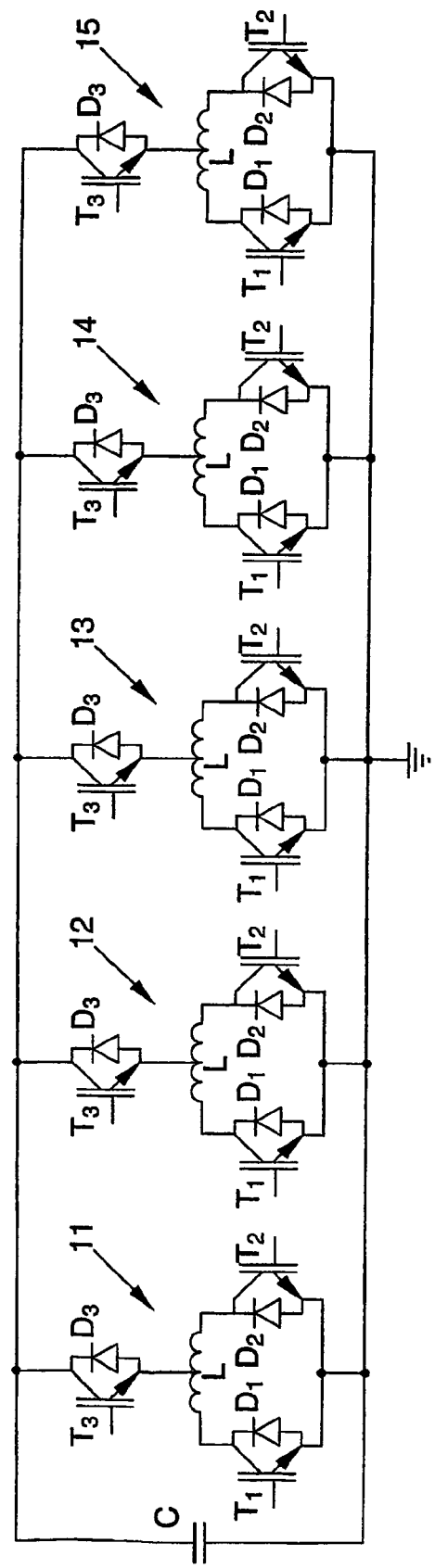
FIG. 3 shows a circuit arrangement according to FIG. 1 with several partial motors and FIG. 4 shows a circuit arrangement according to FIG. 2 with several partial motors.

A circuit arrangement according to FIG. 1 is shown in FIG. 3 for five partial motors 11, 12, 13, 14, 15, i.e., five independent windings on the stator, which are preferably wound onto the stator at equidistant spacing from each other. As can be gathered from FIG. 3, all partial motors 11–15 then can operate on a common capacitor C, which would not be possible, for example, in DE 198 53 516 A1. Another advantage is that not all partial motors 11–15 are situated in the same operating state. By movement of the permanent magnets past the different windings of the partial motors 11–15, one partial motor, for example, is situated in the transition from the working cycle to the nonworking cycle, the other partial motors still being situated in the working cycle. Part of the energy stored in the inductance can therefore be fed directly as working current into the partial motor still in the working cycle, without being temporarily stored in the capacitor. Because of this, the capacitor C, on the one hand, can be made smaller and the voltage surge on capacitor C is reduced.

Figure 4:
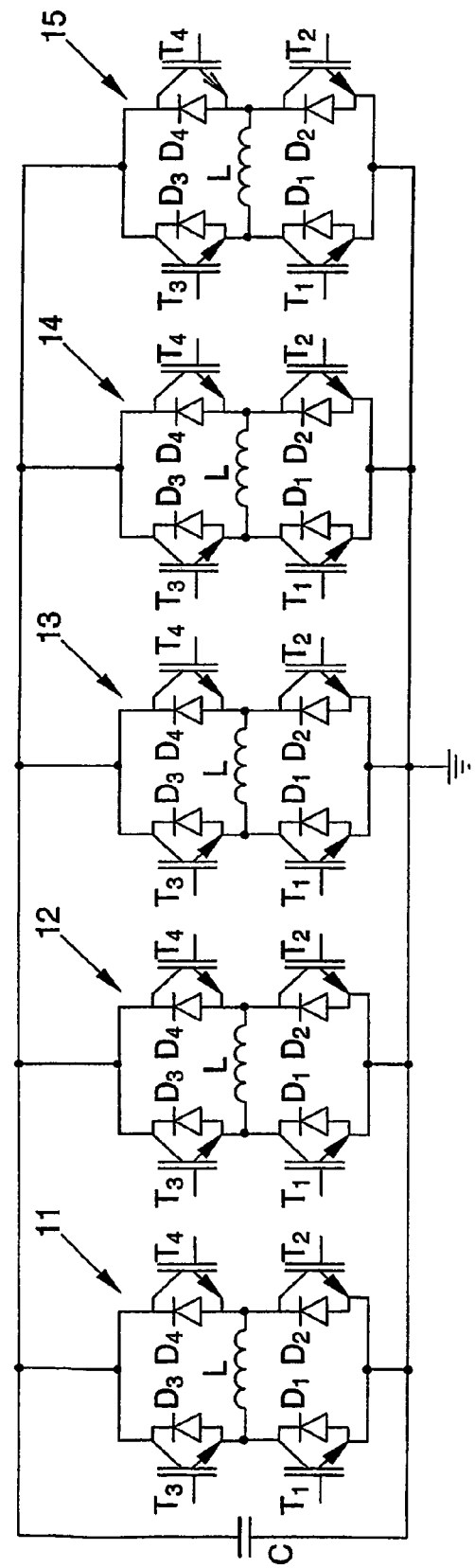

A circuit arrangement according to FIG. 2 is shown in FIG. 4 for five partial motors 11–15, which can also operate on a common capacitor C, so that FIG. 3 can be referred to for this variant.

The invention claimed is:

1. A device for switching currents in a stator winding of a generator-electric motor combination, wherein the stator winding comprises at least one winding that can be shorted or switched to high resistance through at least one device, wherein the at least one winding is connected to a capacitor, by means of which voltage peaks, because of the switching processes, can be reduced and the energy stored in the stator winding can be temporarily stored, wherein at least one switchable decoupling element is arranged between the winding and the capacitor, in which energy to be temporarily stored via decoupling element can be taken off, because of disengagement of the device in a nonworking cycle, as a charging current for the capacitor and the temporarily stored energy can be fed back to the stator winding as working current in the working cycle, wherein the decoupling element is temporarily controlled during feedback, so that the capacitor voltage does not drop below a fixed voltage value.

2. The device according to claim 1, wherein the decoupling element is designed as a switch with parallel-connected recovery diodes.

3. The device according to claim 1, wherein the fixed voltage value for the capacitor voltage is greater than or equal to the voltage on the decoupling element in the nonworking cycle.

4. The device according to claim 1, wherein at least one switching element with parallel-connected recovery diode is arranged on each end of the winding.

5. The device according to claim 4, wherein the decoupling element is connected as a center tap on the winding.

6. The device according to claim 4, wherein the winding is arranged in a bridge circuit, in which two decoupling elements are arranged in one branch and two switching elements with parallel-connected recovery diodes are arranged in the other branch.

7. The device according to claim 6, wherein the switching elements are designed as transistors.

8. The device according to claim 7, wherein the transistors are designed as IGBTs.

9. The device according to claim 1, wherein the stator winding includes several independent windings as partial motors that are designed with a common capacitor.

10. A method for switching currents in a stator winding of a generator-electric motor combination, in which the stator winding has at least one winding that can be shorted or switched to high resistance through at least one device, wherein the at least one winding is connected to a capacitor via a switchable decoupling element, comprising the steps temporarily storing energy stored in the stator winding during high-resistance switching of the winding through a charging current in the capacitor via the decoupling element, and feeding the stored energy back into the stator winding via the connected decoupling element in the working cycle, wherein the capacitor is always discharged only to a capacitor voltage greater than or equal to a fixed voltage value.

11. A device for switching currents in a stator winding of a generator-electric motor combination, comprising:
   a stator winding comprising at least one winding that can be shorted or switched to high resistance through at least one device,
   a capacitor coupled with the at least one winding for reducing voltage peaks and for temporarily storing an energy stored in the stator winding,
   at least one switchable decoupling element arranged between the winding and the capacitor, and
   means for controlling the decoupling element to take off the energy to be temporarily stored via decoupling element in a nonworking cycle as a charging current for the capacitor and to feed the temporarily stored energy back to the stator winding as working current in a working cycle, wherein the decoupling element is temporarily controlled during feedback, so that the capacitor voltage does not drop below a fixed voltage value.

12. The device according to claim 11, wherein the decoupling element is designed as a switch with parallel-connected recovery diodes.

13. The device according to claim 11, wherein the fixed voltage value for the capacitor voltage is greater than or equal to the voltage on the decoupling element in the nonworking cycle.

14. The device according to claim 11, wherein at least one switching element with parallel-connected recovery diode is arranged on each end of the winding.

15. The device according to claim 14, wherein the decoupling element is connected as a center tap on the winding.

16. The device according to claim 14, wherein the winding is arranged in a bridge circuit, in which two decoupling elements are arranged in one branch and two switching elements with parallel-connected recovery diodes are arranged in the other branch.

17. The device according to claim 16, wherein the switching elements are transistors.

18. The device according to claim 16, wherein the switching elements are IGBTs.

19. The device according to claim 11, wherein the stator winding includes several independent windings as partial motors that are designed with a common capacitor.

* * * * *

UNITED STATES PATENT AND TRADEMARK OFFICE
CERTIFICATE OF CORRECTION

PATENT NO. : 7,230,396 B1 Page 1 of 1
APPLICATION NO. : 11/058481
DATED : June 12, 2007
INVENTOR(S) : Sven Martin et al.

It is certified that error appears in the above-identified patent and that said Letters Patent is hereby corrected as shown below:

Face page, Line [54] - Please amend the Title as follows: --"DEVICE AND METHOD FOR SWITCHING OF CURRENTS IN A STATOR WINDING OF A GENERATOR-ELECTRIC MOTOR COMBINATION"--.

Signed and Sealed this

Fourth Day of September, 2007

JON W. DUDAS
*Director of the United States Patent and Trademark Office*